(12) United States Patent
Nanami

(10) Patent No.: US 6,554,664 B1
(45) Date of Patent: Apr. 29, 2003

(54) COOLING SYSTEM FOR WATERCRAFT

(75) Inventor: Masayoshi Nanami, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 09/505,545

(22) Filed: Feb. 17, 2000

(51) Int. Cl.$^7$ .............................................. B63H 21/10
(52) U.S. Cl. ......................................... 440/88; 440/89
(58) Field of Search ....................... 440/88, 89; 60/323

(56) References Cited

U.S. PATENT DOCUMENTS

| | | | |
|---|---|---|---|
| 3,716,992 A | * 2/1973 | Stahl ........................... | 60/323 |
| 4,953,525 A | 9/1990 | Sakurai et al. | |
| 5,647,315 A | 7/1997 | Saito | |
| 5,769,038 A | 6/1998 | Takahashi et al. | |
| 5,809,963 A | 9/1998 | Saito | |
| 5,820,426 A | * 10/1998 | Hale ........................... | 440/88 |
| 5,876,256 A | 3/1999 | Takahashi et al. | |
| 5,885,121 A | 3/1999 | Nanami et al. | |
| 5,921,829 A | 7/1999 | Iwata | |
| 5,980,340 A | 11/1999 | Okamoto | |

* cited by examiner

*Primary Examiner*—Edwin Swinehart
(74) *Attorney, Agent, or Firm*—Knobbe, Martens, Olson & Bear, LLP

(57) ABSTRACT

An engine for a watercraft has a coupling plate interposed between a cylinder block and an exhaust manifold. The coupling plate comprises exhaust passages that complement the shapes of cylinder exhaust discharge ports and the exhaust manifold inlet ports. The coupling plate also includes a water jacket for use with a water cooling system. The cooling system can receive coolant from a pressure chamber within a jet pump unit of the watercraft. The cooling system also can include a lubricant cooler that receives coolant from an engine cooling jacket, an exhaust system cooling jacket or another cooling jacket.

13 Claims, 13 Drawing Sheets

COOLING SYSTEM FOR WATERCRAFT

BACKGROUND OF THE INVENTION

1. Field of the Invention

The present invention generally relates to engines used in watercraft. More particularly, the present invention relates to cooling systems for engines adapted for use in watercraft.

2. Description of the Related Art

Watercraft can be powered by various engine configurations. Some watercraft are powered by outboard motors that are attached to the aft end of the watercraft and that contain internal combustion engines while other watercraft are powered by inboard engines contained within engine compartments formed within the body of the watercraft. The engine compartments are desirably configured as compactly as possible because they necessarily encroach upon the limited floor space of the watercraft.

Until recently, the majority of the inboard engines utilized in smaller sport watercraft have been specially designed for use in such watercraft. The engines are compactly constructed and specially designed for use in small enclosed spaces. For instance, the engines can include specially designed cooling systems that draw coolant from the water in which the watercraft is operating.

Utilizing automotive engines in such watercraft would offer economic advantages because of lower production costs due to higher production quantities. A typical automotive engine, however, is often not properly proportioned or configured to fit within a confined engine compartment of such watercraft. For instance, the watercraft engine compartment can not accommodate the stock exhaust manifold of the automotive engine. Additionally, due to the unique cooling and exhaust systems required for use in marine environments, the stock watercraft manifold can not complement an automotive engine selected for other performance or size characteristics. Accordingly, a variety of manifold designs would become necessary.

SUMMARY OF THE INVENTION

Thus, the present invention relates to cooling systems for use with engines positioned within watercraft. The cooling systems should result in a decreased engine size and, accordingly, a decreased engine compartment size. The cooling system can use a lubricant cooler to cool the engine lubricant. Preferably, the lubricant cooler is positioned along the cooling system of the engine and exhaust system and not separately cooled. Because a separate pump is not necessary for the lubricant cooler, the number of components contained within the engine compartment can be reduced. Preferably, the engine and exhaust cooling systems are supplied with water from a pressure chamber within the jet pump unit of the watercraft, thereby rendering a further cooling water pump unnecessary.

To enable the disclosed cooling system to be more readily adapted for use with a number of engine configurations, the cooling system features a connecting member or adaptor. The connecting member serves as a transitional element between exhaust discharge ports in the cylinder block of the engine and exhaust passages in the exhaust manifold. Accordingly, exhaust passages through the connecting member desirably morph between the discharge port shapes and the manifold inlet port shapes. Thus, a single smooth transitional exhaust passage is formed between the engine and the exhaust manifold.

The illustrated connecting member also is provided with a cooling jacket that communicates with the balance of the cooling system. Because the exhaust gases passing through the connecting member are at their highest temperature at this point in the exhaust system, the connecting member and the associated exhaust passages preferably are cooled by the cooling system. Additionally, by allowing the connecting member cooling jacket to communicate with cooling jackets of the manifold, any bottlenecking connection within the cooling system is moved downstream of the connection between the connecting member and the exhaust manifold.

Accordingly, one aspect of the present invention involves a watercraft comprising an engine, an exhaust manifold, and a coupling plate joining the exhaust manifold to the engine. The engine includes at least one exhaust discharge port. The exhaust discharge port desirably has a certain shape. The exhaust manifold also has at least one exhaust inlet port which also has a certain shape, preferably different that the exhaust discharge port shape. The coupling plate preferably has at least one exhaust passage therethrough. The exhaust passage has a first end and a second end such that the first end is shaped to substantially match the exhaust discharge port shape and the second end is shaped to substantially match the exhaust inlet port shape.

Another aspect of the present invention involves a watercraft comprising an engine, a jet pump unit powered by the engine, and a cooling system having an influent portion and an effluent portion. The engine generally comprises a cylinder block, a cylinder head attached to the cylinder block, and a lubrication system communicating with a cylinder of the cylinder block. The lubrication system preferably includes an oil cooler that is in communication with the effluent portion of the cooling system. The effluent portion of the cooling system is preferably capable of draining coolant from the engine.

BRIEF DESCRIPTION OF THE DRAWINGS

These features, aspects and advantages of the present invention will be more readily understood with reference to the accompanying drawings of several preferred arrangements, which arrangements are merely exemplary and are not limiting of the present invention, and in which drawings.

DETAILED DESCRIPTION OF PREFERRED ARRANGEMENTS OF THE PRESENT INVENTION

Figure 1:
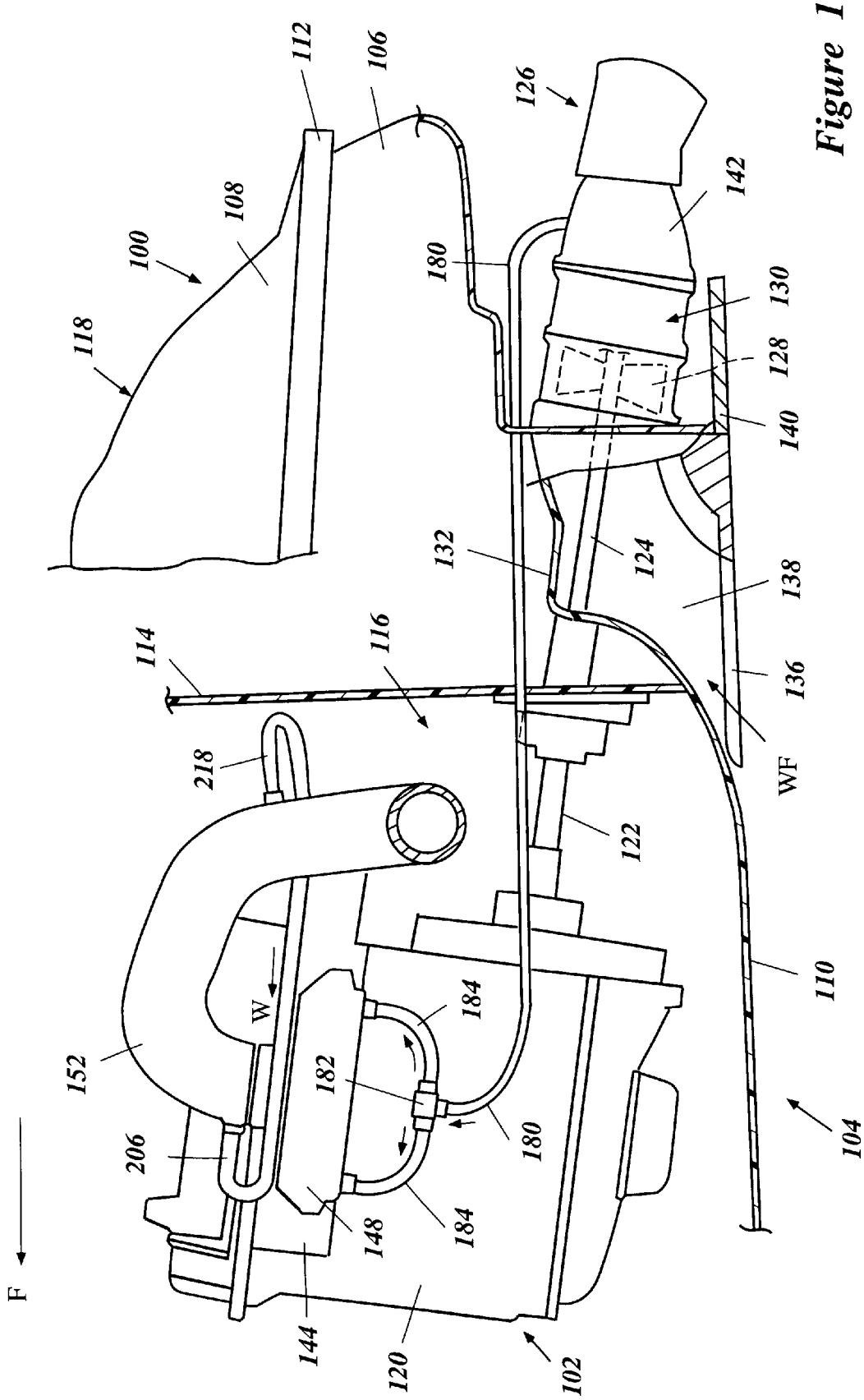
FIG. 1 is a partially sectioned side view of a small watercraft illustrating an engine having an exhaust system and a cooling system configured and arranged in accordance with certain features, aspects and advantages of the present invention.

With reference to FIG. 1, a portion of a small watercraft, indicated generally by the reference numeral 100, is partially illustrated in cross-section. The watercraft 100 is powered in a known manner by an engine 102 having features, aspects and advantages in accordance with the present invention. The engine 102 is better shown in FIGS. 2–6. While the present invention will be described with reference to the illustrated arrangements that feature certain types of engines, the present invention also can be used with other engine configurations. For instance, but without limitation, an exhaust system can extend from either side of the engine (compare FIGS. 1 and 2).

With continued reference to FIG. 1, the watercraft 100 has a hull, indicated generally by the reference numeral 104. The hull 104 can be made of any suitable material; however, a presently preferred construction utilizes molded fiberglass reinforced resin. The hull 104 generally has a lower portion 106 and an upper portion 108. The lower portion generally comprises a bottom surface 110. A bond flange 112 can connect the lower portion 106 to the upper portion 108. Of course, any other suitable technique can be used to interconnect the lower portion 106 and the upper portion 108. Additionally, the lower portion 106 and the upper portion 108 can be integrally formed.

The hull 104 also includes one or more bulkheads 114 which can be used to reinforce the hull internally and which also can serve to define, in part, an engine compartment 116. The illustrated engine compartment 114 is arranged in a portion of the hull 104 just forward of a boarding platform 118; however, the engine compartment 116 can be moved forward of the illustrated location or can be positioned in the are generally occupied by the boarding platform 118.

The engine 102 is mounted within the engine compartment 116 in any suitable manner. For instance, a set of resilient engine mounts (not shown) can be used to connect the engine 102 to a set of stringers (not shown) that extend through the hull. When a single engine is utilized in an application, the engine is desirably mounted in a central transverse position. When dual engines are utilized, the engines are desirably positioned such that the weight of each engine counterbalances with the weight of the other about a central longitudinal vertical plane.

The engine 102 can be of any known configuration. For example, the engine 102 can be a two-stroke, four-stroke or rotary type of engine. Additionally, the engine 102 can comprise any number of cylinders. The illustrated engine is a fourstroke engine having four cylinders. The illustrated engine type, however, is merely exemplary.

The engine 102 is provided with several systems. such as an exhaust system, a cooling system and a fuel system, described with more particularity below. The engine 102 generally comprises a cylinder block 120. At least one cylinder (not shown) is formed within the cylinder block 120. As mentioned above, the engine 102 desirably has four cylinders. The cylinders (not shown) are defined by a cylinder wall and can include a cylinder liner (not shown). A piston (not shown) reciprocates within each cylinder (not shown) in a known manner.

The engine 102 desirably has a crankshaft 122 that generally extends in a longitudinal direction to the rear of the engine 102. The crankshaft 122 can, however, extend in a forward direction or to a side of the engine and can be coupled to a transfer case (not shown) having an output shaft (not shown) which extends rearward. In the illustrated arrangements, the crankshaft 122 is connected to the pistons (not shown) in a known manner and transfers the reciprocating linear motion of the pistons into a rotational motion which is output to a propeller shaft 124.

The crankshaft 122, or other output shaft (not shown), is coupled to the propeller shaft 124 in any suitable manner and drives jet pump unit 126 through the propeller shaft 124. In the illustrated arrangement of FIG. 1, the crankshaft 120 is coupled to the propeller shaft 122 at approximately the same location in which the propeller shaft 124 extends through the bulkhead 114. In this manner, a seal (not shown) can be placed on the bulkhead 114 so as to minimize or eliminate water leakage into the engine compartment 116.

As mentioned above, the propeller shaft 122 transfers driving movement to the jet pump unit 126 as is known in the art. Specifically, an impeller 128 is mounted to the propeller shaft 124 in any suitable manner and is positioned within a jet pump housing 130.

With continued reference to FIG. 1, the jet pump housing 130 is mounted in any suitable manner within a tunnel 132 formed toward the rear of the lower hull portion 106. The tunnel 132 extends generally upward and rearward and can be provided with an intake opening 134 at its forward end.

An intake grate 136 can be positioned over the intake opening 134. The intake grate 134 can serve as a scoop to redirect water passing beneath a moving watercraft into a gullet 138 formed within the tunnel 132. A ride plate 140 can also be positioned over a portion of the tunnel 132 to further define the gullet 138.

Rearward of the impeller 128, a restricting flow nozzle 142 increases the thrust of the watercraft created by the impeller 128 by increasing the velocity of the water passing therethrough. Rearward of the restricting flow nozzle 142, a steering nozzle and reverse thrust bucket can be provided to control the direction of the watercraft in any known manner.

Returning to the engine, a cylinder head 144 is coupled to the cylinder block 120 in any suitable manner. Additionally, a cylinder head cover 143 can be coupled to the cylinder head 144 in a known manner. The piston (not shown) reciprocates within the cylinder (not shown) and defines, in cooperation with the cylinder wall and an internal surface of the cylinder head 144, a combustion chamber (not shown).

An induction system (not shown) communicates with the combustion chamber (not shown) to deliver an air/fuel charge to the engine 102. The induction system (not shown) transfers air into the engine 102 from the atmosphere through intake pipes 145 and introduces a charge of fuel to the air as the air passes a charge former device (not shown). The charge can be introduced in any suitable manner.

For instance, the air/fuel charge can be formed by direct injection, indirect injection (i.e., fuel injectors) or carburetion (i.e., carburetors). The air/fuel charge is then delivered to the combustion chamber (not shown) and ignited by a suitable ignition system (not shown), as is known in the art.

The resulting combustion of the air/fuel charge creates exhaust gases within the combustion chamber (not shown).

Residual fuel can also remain within the combustion chamber following combustion. An exhaust discharge port 145 (see FIG. 11) extends through either the cylinder wall (i.e., two-stroke engines) or through a portion of the cylinder head (i.e., four-stroke engines) to allow the exhaust gases and residual fuel to be exhausted to the environment. In the illustrated arrangement, the exhaust discharge ports 146 are fashioned in a side wall of the cylinder head 144 and communicate with corresponding exhaust inlets 150 in an exhaust manifold 148. If desired, the exhaust discharge ports 146 can be provided with appropriate exhaust control valves (not shown), as is known.

The exhaust manifold 148 typically transfers exhaust gases from the combustion chamber (not shown) to a common exhaust pipe 152. The exhaust manifold 148 thus generally comprises a merge chamber 154 (see FIGS. 10 and 11) and a plurality of exhaust runner passages 156. The exhaust runner passages 156 connect the exhaust manifold inlets 150 to the merge chamber 154. It is, however, contemplated that a conventional branched exhaust manifold can also be used to transfer the exhaust gases from multiple cylinders to a single common exhaust pipe.

The above-described environment presents a mere example of the environment in which the present invention can find utility. As such, much of the above-described components are well known to those of skill in the art. Accordingly, any details omitted are deemed to be well known and further discussion of the same is deemed unnecessary.

Figure 7:
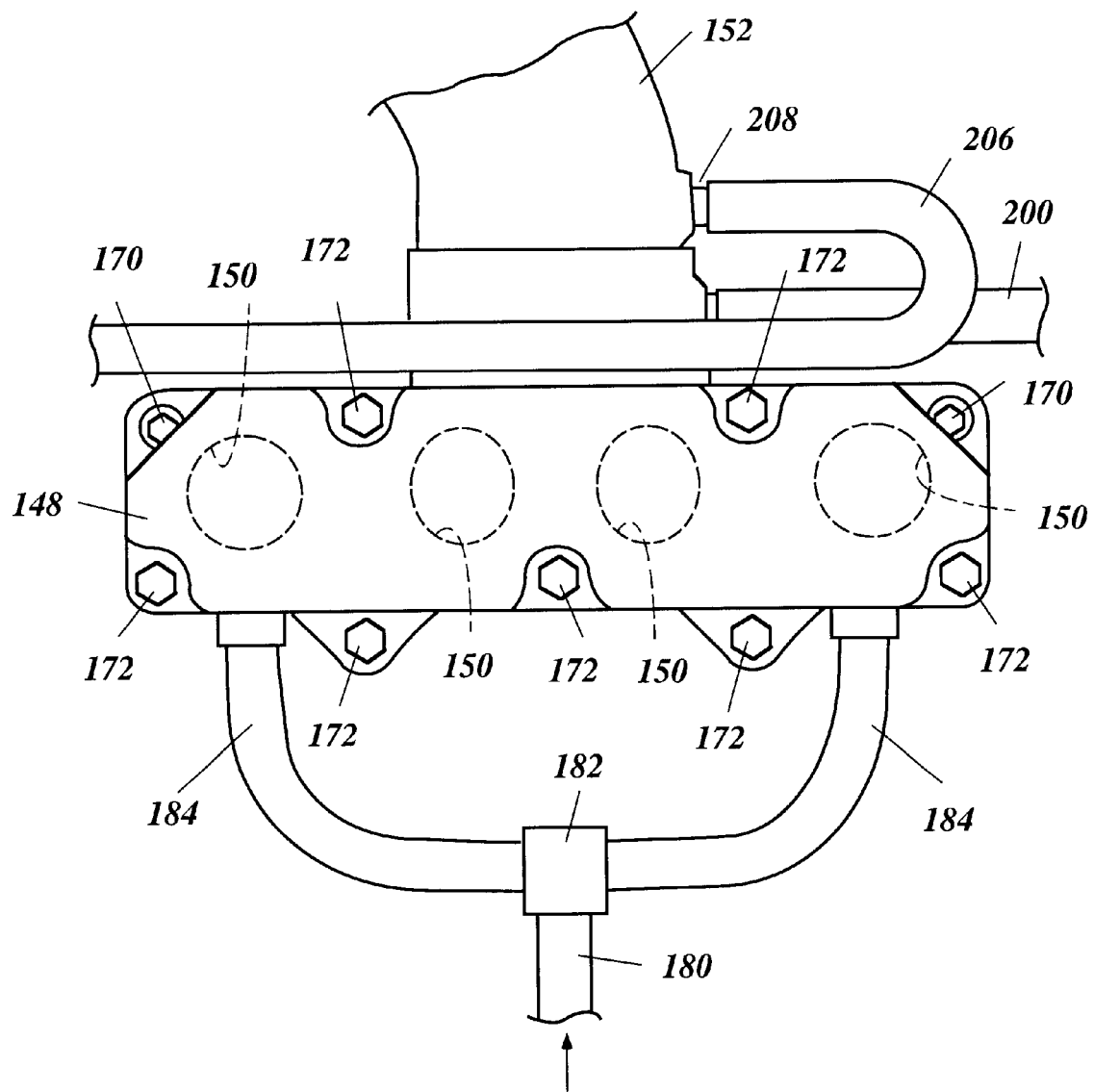
FIG. 7 is a side view of an exhaust manifold and a connecting member mounted between an engine and a exhaust manifold, with the connecting member being constructed and arranged in accordance with certain features, aspects and advantages of the present invention.
Figure 8:
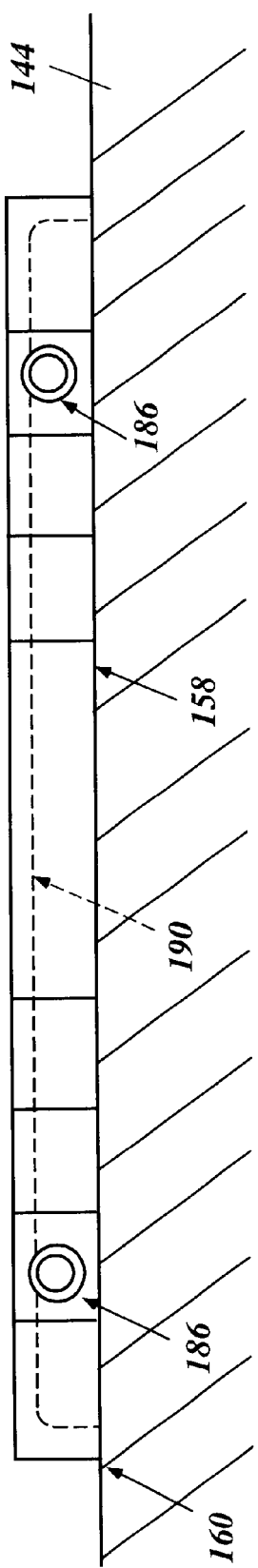
FIG. 8 is a bottom view of the connecting member of FIG. 7.

In the illustrated arrangement, a connecting member 160 is interposed between the exhaust manifold 148 and the cylinder head 144. With reference to FIGS. 7–12, exhaust passages and a method of connecting the three components together will now be described in detail. With reference initially to FIG. 7, the exhaust manifold 148 is illustrated in a mounted position adjacent the connecting member 160 on a side of the cylinder head 144. The exhaust manifold inlets 150 corresponding to each cylinder are illustrated in broken lines. With reference to FIG. 10, the same manifold inlets 150 are clearly depicted in a view of the connecting member from the exhaust manifold mounting side. Additionally, the common exhaust pipe 152 is shown extending upward from a top surface of the exhaust manifold 148.

Figure 9:
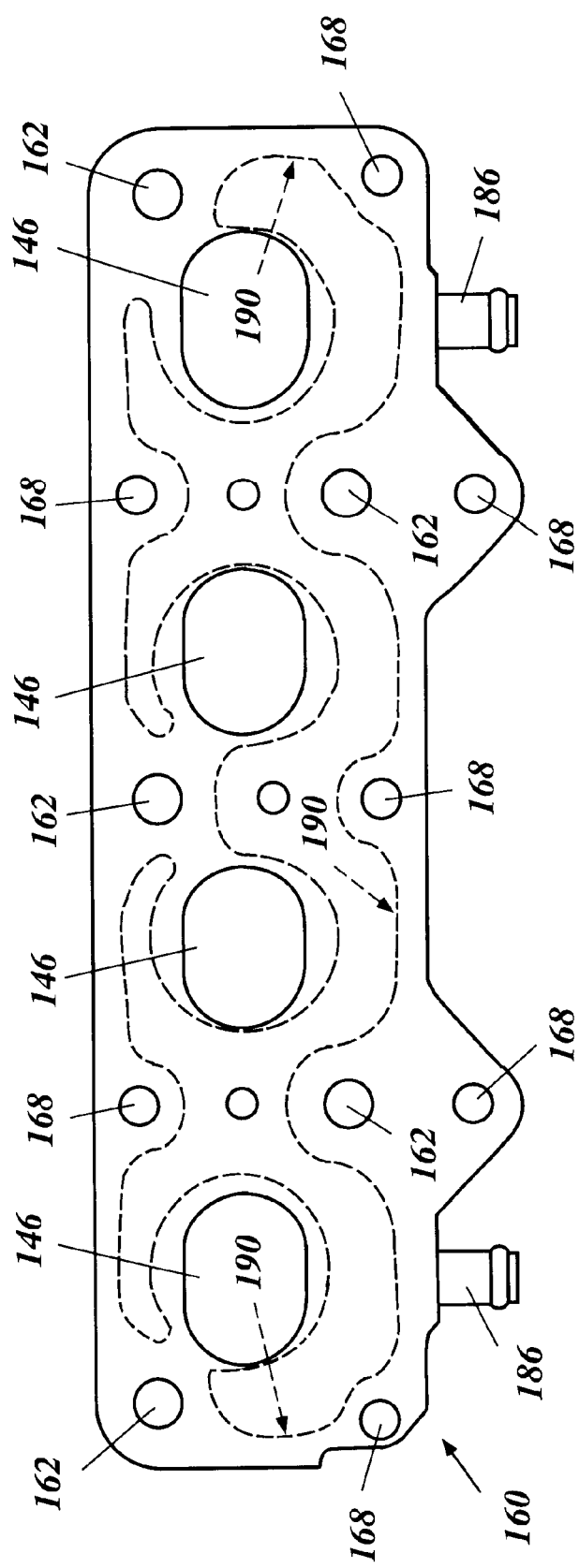
FIG. 9 is an engine side view of the connecting member of FIG. 7.
Figure 10:
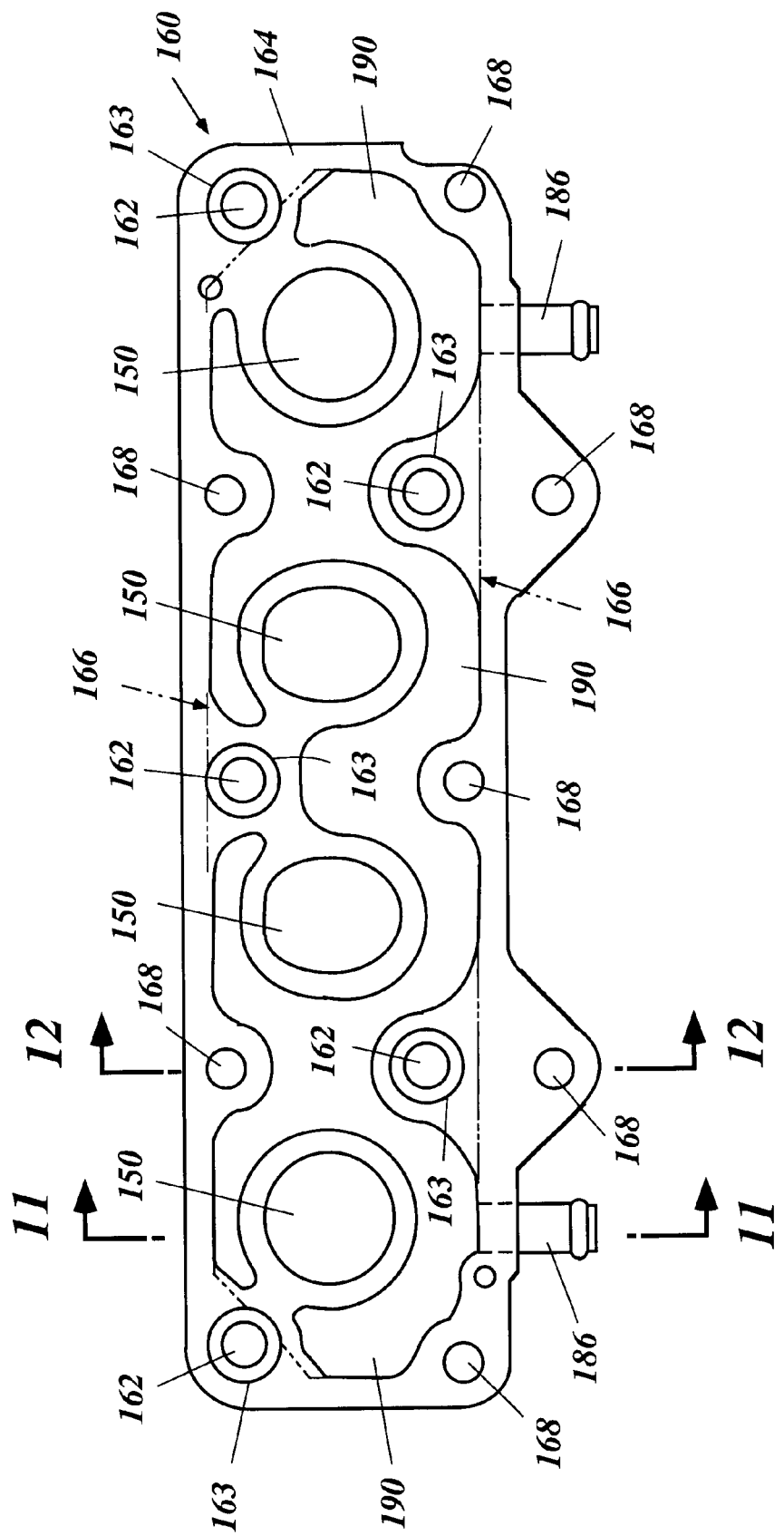
FIG. 10 is an exhaust manifold side view of the connecting member of FIG. 7.

With reference now to FIG. 9, inlet ports of the connecting member 160 corresponding to the discharge ports of each cylinder are depicted in solid line in the view from the cylinder head mounting side. Because the connecting member 160 generally comprises at lest one passage defined therethrough, a transfer of exhaust gases from the exhaust discharge port to the manifold is enabled. It should be recognized that the connecting member can comprise a single integral member which contains a passage corresponding to each exhaust port of the cylinder block or it can comprise a smaller member which contains passages which correspond to fewer than all of the exhaust ports. The connecting member passages are, therefore, desirably in alignment with the exhaust port of the cylinder block and the exhaust runner passages which extend through the manifold. A continuous exhaust conduit is thus created from the cylinder to the manifold through the connecting member or members.

With reference to FIGS. 7, 9 and 10, one of skill in the art can readily appreciate the smooth transition between the shape of the exhaust discharge port 146 and the shape of the exhaust manifold inlet 150 which is accomplished by the connecting member 160. The connecting member 160 thus forms a portion of a continuous exhaust flow passage having a blended shape from the combustion chamber (not shown) to the manifold 148 discharge location. This shape-shifting function is also clearly illustrated in FIG. 11.

With renewed reference to FIGS. 7, 9 and 10, a mounting arrangement and method of mounting the connecting member 160 will be described in detail. As best illustrated in FIG. 10, the illustrated connecting member 160 is provided with two zigzagging series of mounting apertures. In the illustrated arrangement, the first series comprises five countersunk apertures 162. As illustrated, a countersunk portion 163 of each aperture 162 preferably is positioned on the side of the connecting member 160 to which the manifold 148 attaches. Desirably, the location of each of the apertures 162 corresponds to a mounting hole in the engine. The mounting holes are provided in most conventional engines to enable an exhaust manifold to be bolted thereto. In the illustrated arrangement, each aperture 162 is also positioned on a boss or similar structure such that the entirety of the aperture 162 and the countersink 163 are located on a peripheral structure 164. The peripheral structure 164 is defined in part by actual wall surfaces and in part by imaginary wall extensions 166.

A second series of zigzagging apertures 168 is also present within the illustrated connecting member 160. The second series of apertures 168 generally comprises seven throughholes in the illustrated arrangement. As will be appreciated by those of skill in the art, the second series of apertures 168 can be threaded or nonthreaded. Additionally, each of the second series of apertures 168 also is arranged on the peripheral structure 164.

With reference now to FIG. 7, the sequential mounting of the illustrated connecting member 160 and the exhaust manifold 148 to the cylinder head 144 will be described. A set of gaskets 158 can be interposed between the cylinder head 144 and the connecting member 160 and the connecting member 160 and the exhaust manifold 148. As illustrated, the connecting member 160 desirably is attached to the cylinder head 144 via a corresponding set of threaded fasteners 170. In the illustrated arrangement, the threaded fasteners 170 are bolts or the like. A head 171 of the bolt is received within the countersunk portion 163 of the first set of apertures 162. In this fashion, the surface of the connecting member 160 to which the exhaust manifold 148 attaches is at least substantially obstruction-free. As will be recognized, other configurations that allow the connecting member 160 to be attached to the engine 102, while also allowing subsequent attachment of the exhaust manifold 158, can be used.

Figure 12:
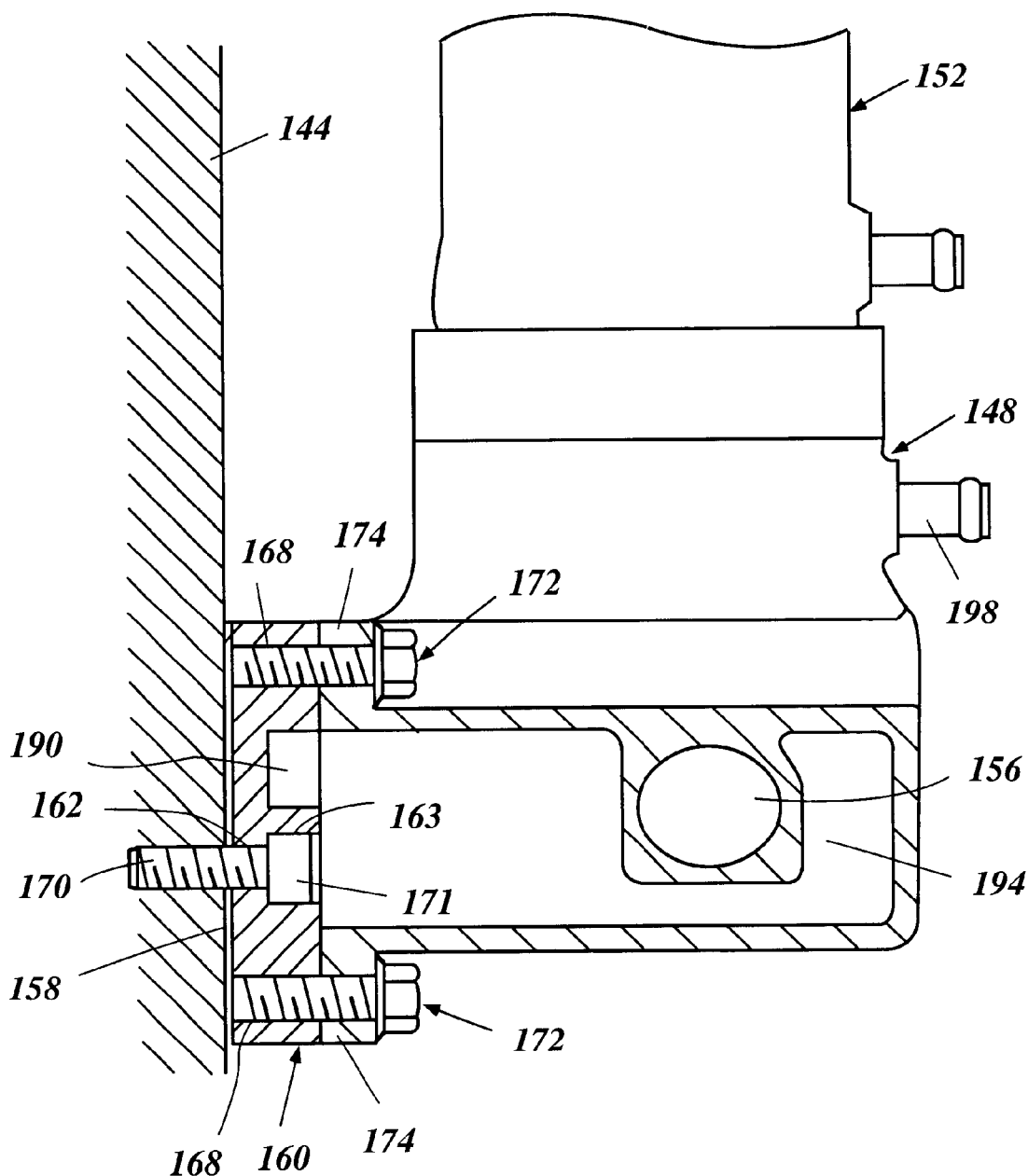
FIG. 12 is a sectional view of the connecting member taken along the line 12—12 of FIG. 10.

With continued reference to FIG. 7, the exhaust manifold can be assembled to the surface of the connecting member 160 that faces away from the engine 102 and the cylinder head 144. A second corresponding set of threaded fasteners 172 also can be used for this purpose. As illustrated in FIG. 12, the illustrated exhaust manifold 148 has a peripheral flange 174 that is secured to the periphery of the connecting member 160 via the threaded fastens 172. In the illustrated arrangement, at least one of the first set of threaded fasteners 170 preferably is concealed by the exhaust manifold 148 while the second set of threaded fasteners 172 extend through the exhaust manifold's peripheral flange into threaded apertures in the connecting member 160. More preferably, at least a majority of the first set of threaded fasteners 170 is concealed.

As is known, the balance of the exhaust system is coupled to the exhaust manifold 148 at an exhaust header pipe (not shown). A catalyst (not shown) can be strategically positioned within the exhaust system to treat the residual fuel and exhaust gases to reduce any atmospheric and/or water pollution resulting from operation of the watercraft 100. The balance of the exhaust system desirably conveys the exhaust gases to an exhaust system discharge (not shown) which is desirably arranged below the waterline (not shown) of the water in which the watercraft 100 is operating. For instance, the exhaust discharge (not shown) can be positioned within the tunnel 132 or through another submerged surface of the hull of the watercraft. As will be recognized, the exhaust discharge (not shown) can also be above the water line.

The illustrated engine 102 also comprises a cooling system. A portion of the cooling system can cool the exhaust gases exiting the cylinder block 120. Another portion of the cooling system can cool oil flowing through an oil separator 158. The cooling system also cools the cylinder block 120 itself, particularly in the regions surrounding the cylinders.

With reference to FIG. 1, the illustrated cooling system picks up cooling water W from the body of water in which the watercraft is operating. Specifically, the cooling water W is pulled from the water WF flowing through the restricting flow nozzle 142 of the jet pump unit 126. By picking up the cooling water W from this location, the cooling system benefits from the increased pressure within the restricting flow nozzle 142 or pressure chamber.

The pressurized cooling water W is forced through an intake tube 180 which extends forward from the jet pump unit 126 toward the engine 102 in the illustrated arrangement. With continued reference to FIG. 1, the illustrated intake tube 190 is split at a t-connector 182 into two inlet branches 184 that extend to the connecting member 160. As will be recognized, the intake tube 180 can also extend to the connecting member 160 without a split. However, the use of more than one intake route allows the flow into the connecting member 160 to be increased over the more restricted flow through a single member. Additionally, where more than one connecting member is utilized, the intake tube 180 can be split into a corresponding number of inlet branches.

In the illustrated arrangement, the cooling water W is introduced into the connecting member 160 via a pair of inlet nipples 186. With reference now to FIGS. 8 and 9–11, the inlet nipples 186 depend from a lower surface of the connection member 160 (i.e., a portion of its peripheral structure) and define an entrance passage 188 (see FIG. 11). Of course, other connecting hardware can also be used, such as, quick connect couplings, threaded coupling or the like.

The cooling water W flows around the exhaust passages defined in the connecting member 160 between the exhaust discharge port 146 of the cylinder head 144 and the exhaust manifold inlets 150 within a connecting member water jacket 190. The connecting member water jacket 190 is in fluid communication with the inlet nipples 186. As illustrated in FIGS. 9 and 10, the water jacket 190 lines a portion of the exhaust passages through the connection member 160. The illustrated water jacket 190 is desirably H-shaped; thus, the water jacket 190 substantially envelops each of the exhaust passages through the connecting member 160. The water jacket formed within the connecting member 160 also is desirably substantially open to the manifold side as illustrated in FIG. 10.

Figure 11:
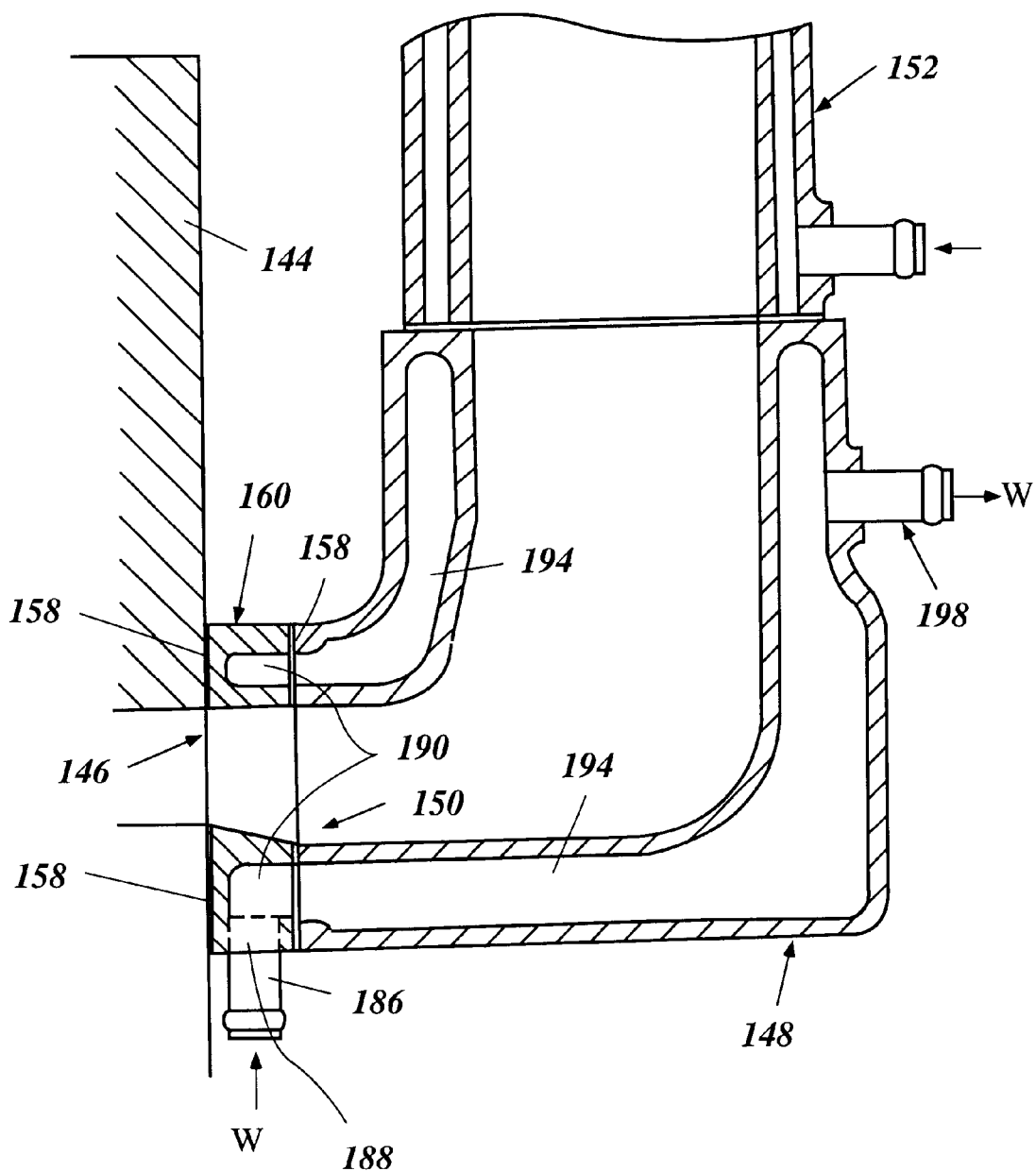
FIG. 11 is a sectional view of the connecting member taken along the line 11—11 in FIG. 1

With reference now to FIG. 11, the water jacket 190 of the connection member 160 desirably communicates with a water jacket 194 of the exhaust manifold 148. As discussed above, the exhaust manifold 148 preferably extends upward from the connection member 160. Accordingly, the illustrated exhaust manifold water jacket 194 also extends upward from the connection member 160. The illustrated exhaust manifold water jacket 194 substantially encases both the merge chamber 154 (see FIG. 11) and the exhaust runner passages 156 (see FIG. 12). Thus, the exhaust gases flowing therethrough can be cooled by the cooling water flowing within the water jacket 194.

An outlet nipple 198 also is provided, which nipple 198 connects with the manifold water jacket 194 proximate an outlet end of the exhaust manifold 148. Of course, the outlet nipple 198 also can be replaced with any other suitable connecting hardware. With reference to FIGS. 1 and 11, the cooling water outlet nipples 198 can be configured to extend parallel or perpendicular to the cylinder block as desired for any application. It is also contemplated that the outlet nipples can extend outward from the exhaust manifold in any other desired direction.

Figure 3:
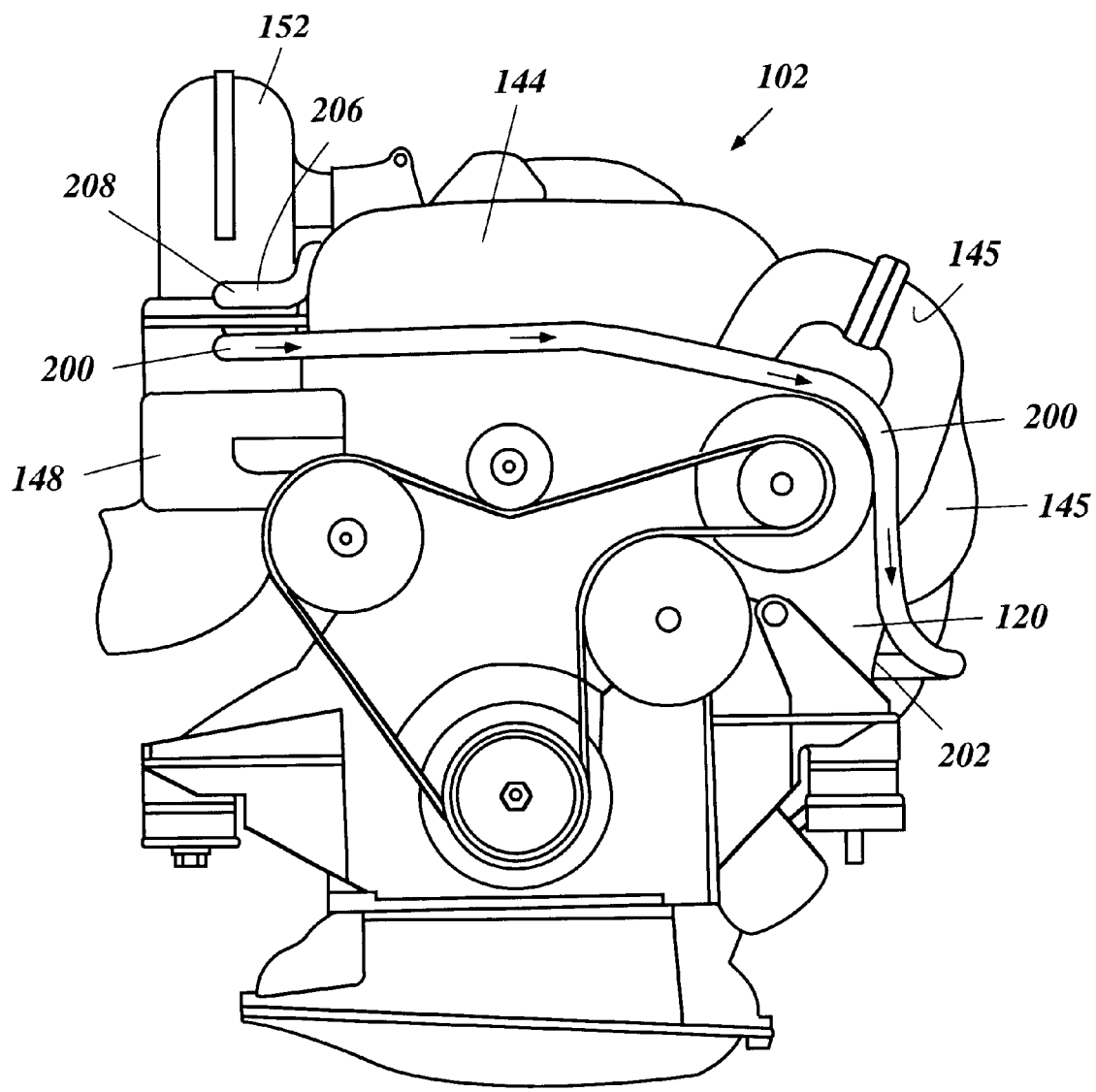
FIG. 3 is a front view of the engine of FIG. 2.
Figure 4:
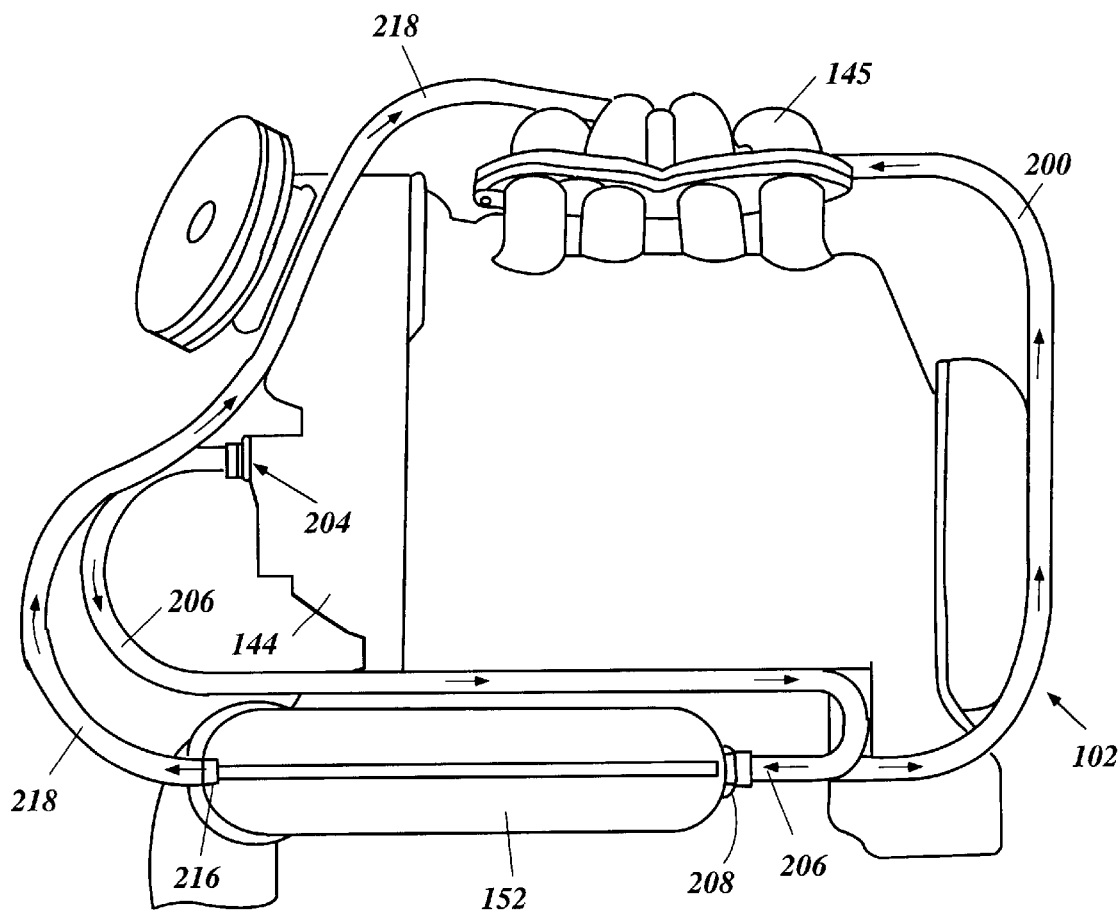
FIG. 4 is a top view of the engine of FIG. 2.
Figure 5:
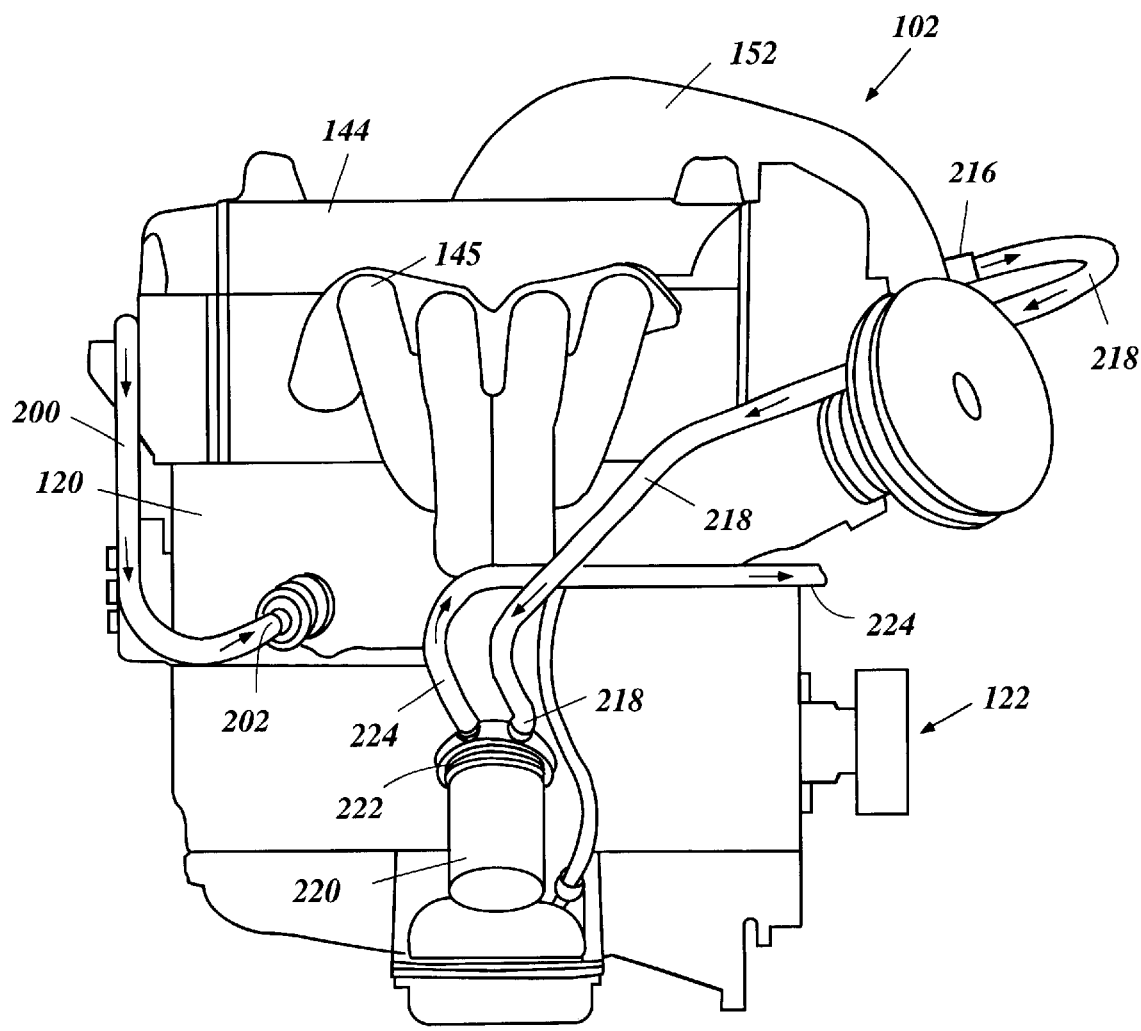
FIG. 5 is a side view of the engine of FIG. 2.
Figure 6:
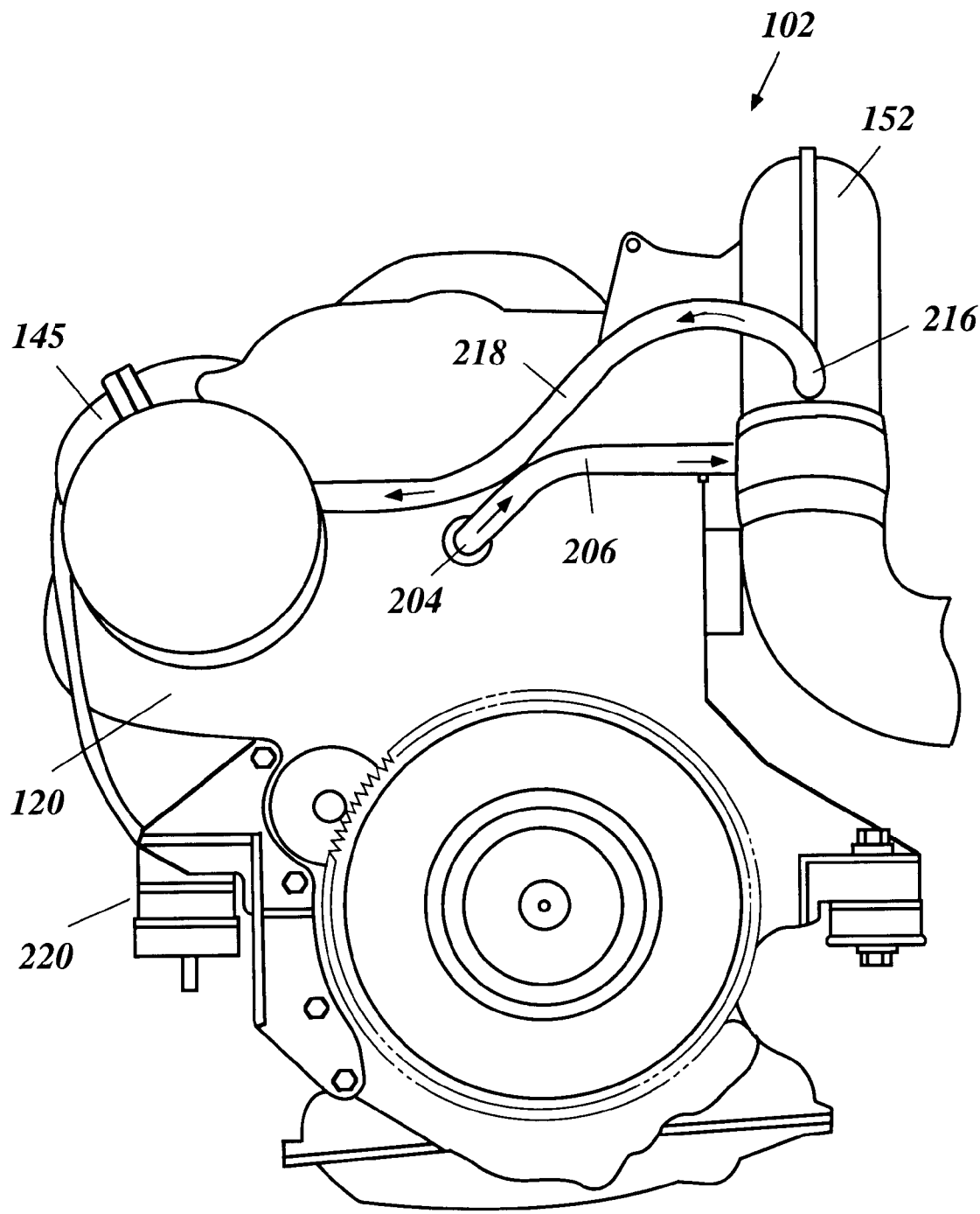
FIG. 6 is a rear view of the engine of FIG. 2.

The first transfer line 200 carries the cooling water W from the exhaust manifold 148 to a water jacket (not shown) formed within the cylinder block 120. With reference to FIG. 4, the illustrated first transfer line 200 extends forward and downward to wrap around a front surface of the engine 102. With reference now to FIGS. 3 and 5, an inlet 202 into the cylinder block water jackets (not shown) can be arranged on a lower portion of the side of the cylinder block 120 opposite of the exhaust discharge ports 146. The cooling water W desirably is passed through the plurality of cooling jackets (not shown) within the cylinder block 120 as is known.

With reference now to FIGS. 4 and 5, the cooling water W then passes out of the cylinder block cooling jackets (not shown) through a discharge coupling 204. The discharge coupling 204 in the illustrated arrangement extends from the front end of the cylinder block 120. The cooling water W is then carried by a second transfer line 206 from the cylinder block discharge coupling 204 to an inlet 208 formed at the base of the exhaust header or common exhaust pipe 152.

Figure 2:
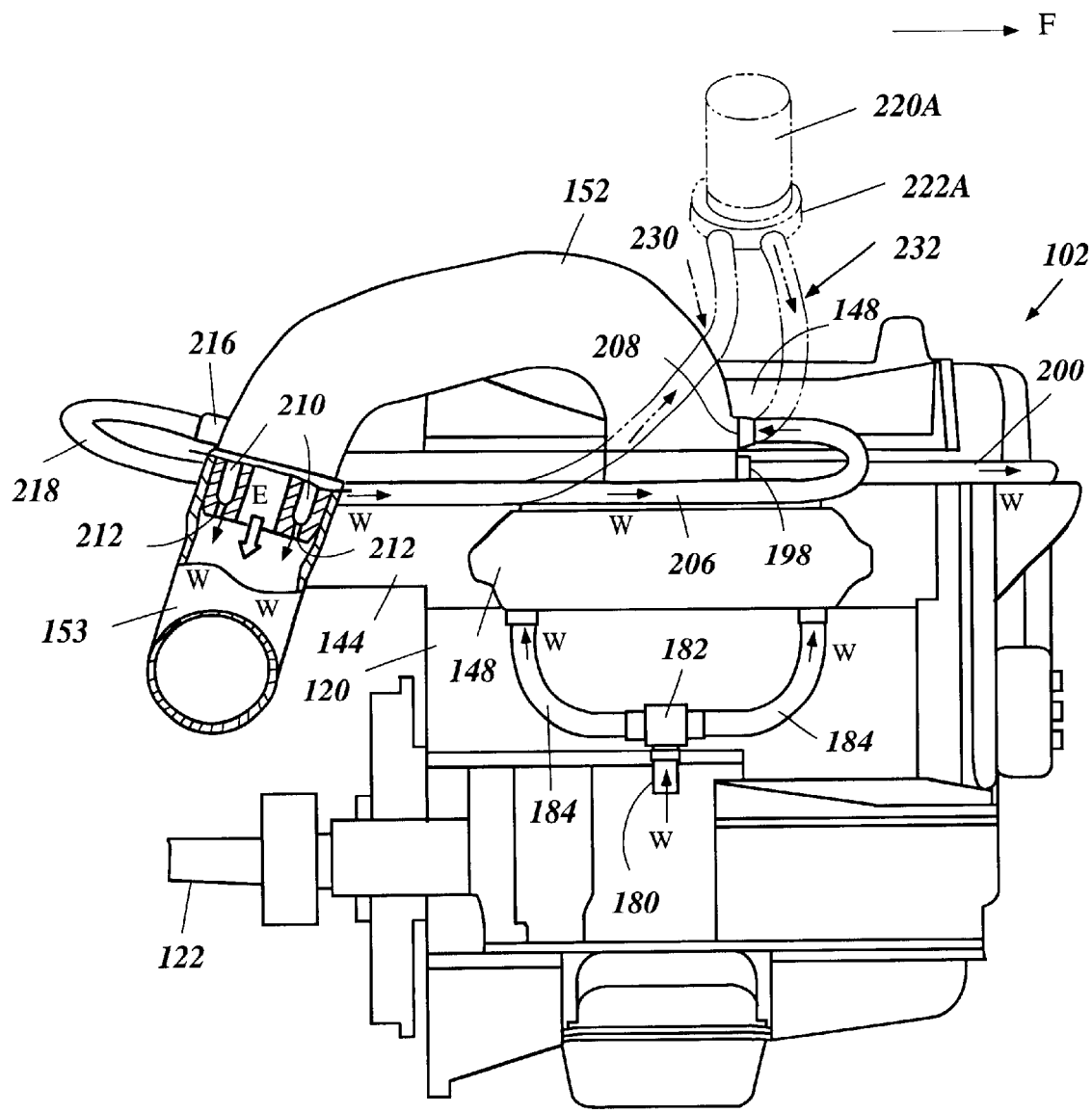
FIG. 2 is a partially sectioned side view of another engine having an exhaust system and a cooling system configured and arranged in accordance with certain features, aspects and advantages of the present invention.

With reference to FIG. 2, the common exhaust pipe inlet 208 is in fluid communication with a further cooling jacket (not shown) having cooling passages 210 which can encase a portion of the common exhaust pipe. The common exhaust pipe cooling jacket (not shown) continues along the common exhaust pipe 152 from the exhaust header to a merge point 212 in a double wall shell construction. At the merge point, a portion of the cooling water W can be introduced into the exhaust flow E as is known.

With reference to FIG. 5, prior to the merge point 212, a portion of the cooling water W can be diverted from the exhaust pipe cooling jacket (not shown) through a diverting coupling 216. The diverted cooling water W can be carried via a third transfer line 218 to an oil cooler 220. Oil or other lubricant from an engine lubrication system can be cooled within the oil cooler 220. Advantageously, the diverted cooling water W, which has been heated to some degree, can be passed through a cooling ring 222 of the oil cooler 220 and then dumped from the watercraft through a discharge line 224. The discharge line 224 can also supply, or serve as, a tell tale line which indicates an operational characteristic of the cooling system (i.e., provides visual confirmation that the cooling system is operational).

Another aspect of the present invention involves adjusting the order of the components being cooled. For instance, with reference to FIG. 2, the oil cooler 220A can be interposed within the cooling circuit between the cylinder block cooling jacket (not shown) and the exhaust pipe cooling jacket (not shown). In other words, a feeder line 230 draws cooling water W from the cylinder block cooling jacket to supply the oil cooler 220A. Another transfer line 232 then transfers the cooling water W to the exhaust pipe cooling jacket. In such a configuration, the need draw off a portion of the cooling water W from the exhaust pipe cooling jacket (not shown) through the diverting coupling 116 is obviated. However, as will be recognized by those of skill in the art, a portion of the cooling water W can be drawn to supply a tell-tale discharge (not shown) such that the operator of the watercraft can have a visual confirmation of an operational characteristic of the cooling system.

Figure 13:
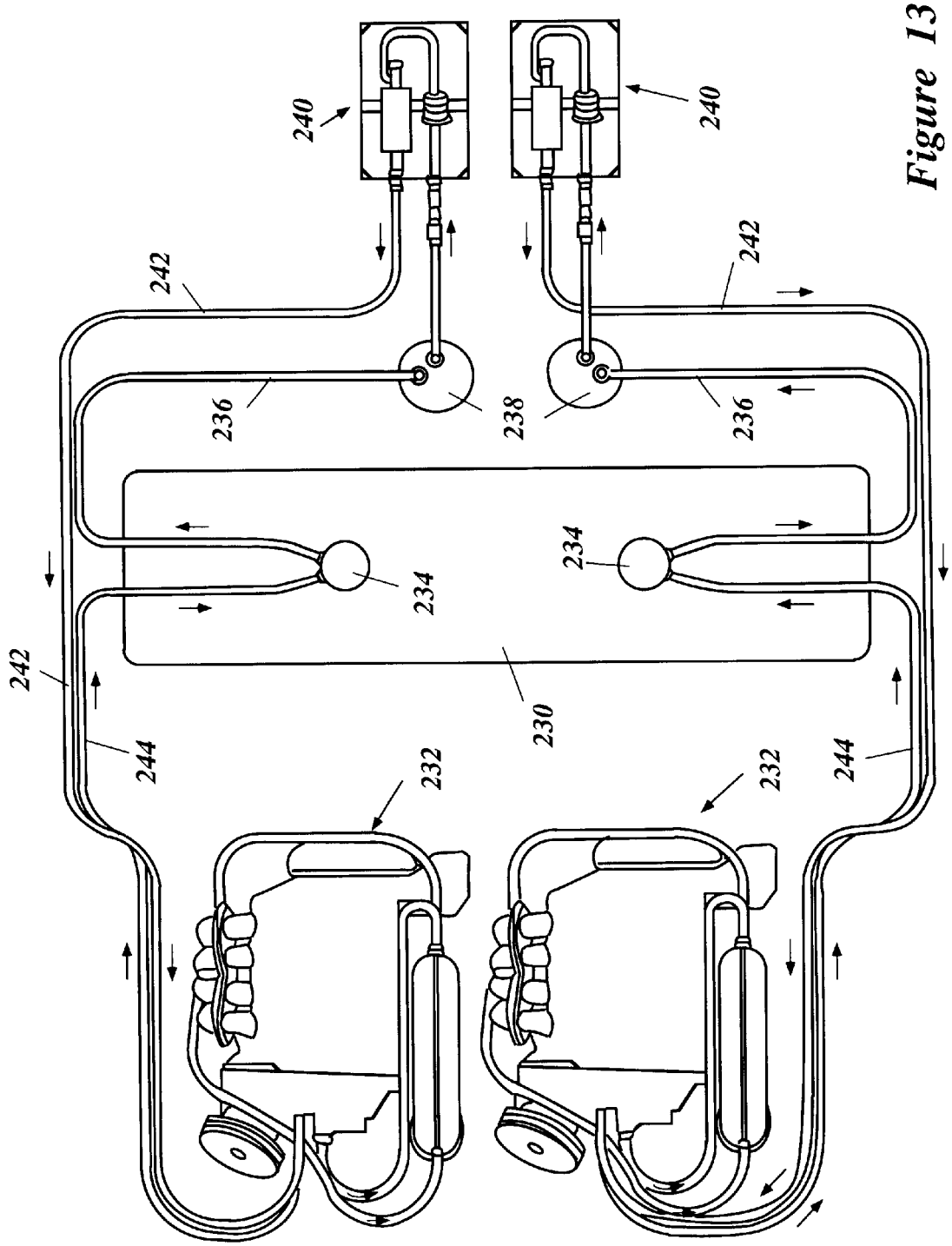
FIG. 13 is a schematic diagram of a twin engine fuel supply system.

With reference now to FIG. 13, a fuel supply system is illustrated in connection with twin engines utilizing the above-described cooling systems. In the illustrated fuel supply system, a single fuel tank 230 is utilized to provide the necessary operating fuel to two engines 232.

As is illustrated a pair of fuel pick-ups 234 are positioned within the fuel tank 230. A corresponding pair of feeder lines 236 extend between the fuel pick-ups 234 and a pair of fuel filters 238. The fuel filters 238 can remove vaporized fuel and other impurities from the fuel being transferred by the fuel system.

A pair of fuel pumps 240 pump the fuel from the fuel feeder lines 236 into a corresponding pair of fuel delivery lines 242. The fuel delivery lines 242 transfer fuel to a charge former within the engines 232. In the illustrated arrangement, the charge formers are desirably fuel injectors. Accordingly, unused fuel is returned to the fuel tank through a return line 244.

Although the present invention has been described in terms of certain disclosed embodiments, other embodiments apparent to those of ordinary skill in the art also are within the scope of this invention. Thus, various changes and modifications can be made without departing from the spirit and scope of the invention. Accordingly, the scope of the invention is intended to be defined only by the claims that follow.

What is claimed is:

1. A watercraft comprising an engine, an exhaust manifold, and a coupling plate joining the exhaust manifold to the engine, the engine comprising at least one exhaust discharge port, the exhaust discharge port having a first shape, the exhaust manifold having at least one exhaust inlet port, the exhaust inlet port having a second shape, the coupling plate having at least one exhaust passage therethrough, the exhaust passage having a first end and a second end, the first end shaped to match the first shape and the second end shaped to match the second shape, wherein a cooling jacket is defined within the coupling plate such that the cooling jacket is adjacent to the at least one exhaust passage.

2. The watercraft of claim 1, wherein the coupling plate is attached to the engine with a first set of threaded fasteners and the exhaust manifold is attached to the coupling plate with a second set of threaded fasteners.

3. The watercraft of claim 2, wherein at least one of the first set of threaded fasteners is concealed by the exhaust manifold.

4. The watercraft of claim 1, wherein a first liquid-resistant gasket is interposed between the engine and the coupling plate and a second liquid-resistant gasket is interposed between the coupling plate and the exhaust manifold.

5. The watercraft of claim 1, wherein the engine further comprises a cylinder block and a cylinder head and the at least one exhaust discharge port is positioned within the cylinder head.

6. The watercraft of claim 1, wherein the cooling jacket is substantially open to one side of the coupling plate.

7. The watercraft of claim 6, wherein the cooling jacket is substantially open to the manifold side of the coupling plate.

8. The watercraft of claim 1, wherein the coupling plate cooling jacket is in fluid communication with an exhaust manifold cooling jacket.

9. The watercraft of claim 1, wherein a portion of the cooling jacket has a substantially H-shaped appearance from the exhaust manifold side.

10. The watercraft of claim 1, wherein the exhaust discharge port is defined on a lateral side of the engine.

11. The watercraft of claim 1, wherein the engine includes a plurality of exhaust ports disposed on a lateral side of the engine.

12. The watercraft of claim 11, wherein the exhaust manifold includes a plurality of exhaust gas passages, each exhaust gas passage communicating with one of the exhaust ports.

13. The watercraft of claim 13, wherein the exhaust manifold includes a merging portion in which the exhaust gas passages merge into a common exhaust gas passage.

* * * * *